US008854257B2

(12) United States Patent
Hamner et al.

(10) Patent No.: US 8,854,257 B2
(45) Date of Patent: Oct. 7, 2014

(54) CONFORMAL ARRAY, LUNEBURG LENS ANTENNA SYSTEM

(71) Applicant: The United States of America as represented by the Secretary of the Army, Washington, DC (US)

(72) Inventors: Christopher A. Hamner, Huntsville, AL (US); Robert A. Spencer, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 247 days.

(21) Appl. No.: 13/657,406

(22) Filed: Oct. 22, 2012

(65) Prior Publication Data
US 2014/0139370 A1 May 22, 2014

(51) Int. Cl.
*H01Q 19/06* (2006.01)
*G01S 13/72* (2006.01)
*G01S 7/02* (2006.01)
*G01S 7/03* (2006.01)
*G01S 13/44* (2006.01)
*G01S 13/66* (2006.01)
*H01Q 19/00* (2006.01)

(52) U.S. Cl.
CPC . *G01S 13/66* (2013.01); *G01S 7/03* (2013.01); *G01S 13/4463* (2013.01)
USPC ........ 342/175; 343/700 R; 343/753; 343/754; 343/907; 343/909; 343/911 R; 343/911 L; 343/700 MS; 342/27; 342/73; 342/74; 342/75; 342/80; 342/81; 342/82; 342/89; 342/147; 342/149

(58) Field of Classification Search
CPC ............. G01S 7/02; G01S 7/03; G01S 13/02; G01S 13/06; G01S 13/42; G01S 13/44; G01S 13/4463; G01S 13/66; G01S 13/68; G01S 13/685; G01S 13/70; G01S 13/72; G01S 13/723; G01S 13/726

USPC ................ 342/5, 11, 27, 28, 73–82, 89–103, 342/147–158, 175, 195; 343/700 R, 753, 343/754, 907, 909, 910, 911 R, 911 L, 343/700 MS
See application file for complete search history.

(56) References Cited

U.S. PATENT DOCUMENTS 3,175,213 A * 3/1965 Varela ............................ 342/157
4,086,597 A * 4/1978 Sinsky et al. .................. 343/754
(Continued)

OTHER PUBLICATIONS

I. Alexander et al., "Conical and Broadside Radiation of a Discrete Spherical Luneburg Lens Fed by a Conformal Printed Antenna"; Proceedings of the 15th International Conference on Microwaves, Radar and Wireless Communications, MIKON-2004; pp. 305-309; IEEE, Dec. 1, 2004.*

(Continued)

*Primary Examiner* — Bernarr Gregory
(74) *Attorney, Agent, or Firm* — Michael K. Gray

(57) ABSTRACT

A Luneburg lens is used in conjunction with a patch antenna array. The patch antenna array is conformed or adapted to cover a portion or backside of the Luneburg len's surface with the backplane of the conformed antenna array defining a field of regard (FOR) in which objects are detected and tracked. A processor is connected to a receiver/exciter module which connects to transmit/receive modules which are connected to the individual patch antennas through a network of MEMS switches. In a receive mode, selected subarrays of the conformed patch antenna array are scanned during selected time intervals with the sum and delta beams being formed coherently in amplitude and phase to realize amplitude monopulse sensing and angle tracking of an object.

6 Claims, 13 Drawing Sheets

(56) References Cited

U.S. PATENT DOCUMENTS

| | | | |
|---|---|---|---|
| 5,455,589 A * | 10/1995 | Huguenin et al. | 342/175 |
| 5,680,139 A * | 10/1997 | Huguenin et al. | 342/175 |
| 6,717,544 B2 * | 4/2004 | Nagasaku et al. | 342/27 |
| 6,833,806 B2 * | 12/2004 | Nagasaku et al. | 342/27 |
| 7,151,508 B2 * | 12/2006 | Schaffner et al. | 343/911 L |
| 7,154,432 B2 * | 12/2006 | Nagasaku et al. | 342/27 |
| 7,259,723 B2 * | 8/2007 | Himmelstoss et al. | 343/753 |
| 7,310,061 B2 * | 12/2007 | Nagasaku et al. | 342/175 |
| 7,345,652 B2 * | 3/2008 | Schaffner et al. | 343/911 L |
| 7,358,913 B2 * | 4/2008 | Ebling et al. | 343/753 |
| 7,532,153 B2 * | 5/2009 | Nagasaku et al. | 342/175 |
| 7,605,768 B2 * | 10/2009 | Ebling et al. | 343/754 |
| 7,786,928 B2 * | 8/2010 | Hansen et al. | 342/175 |
| 7,796,080 B1 * | 9/2010 | Lynch et al. | 343/911 L |
| 7,800,549 B2 * | 9/2010 | Rebeiz et al. | 343/754 |
| 7,961,140 B2 * | 6/2011 | Binzer | 342/175 |
| 8,098,187 B1 * | 1/2012 | Lynch et al. | 343/911 L |
| 8,803,738 B2 * | 8/2014 | Nguyen et al. | 343/700 MS |
| 2012/0146842 A1 * | 6/2012 | Kang | 342/175 |

OTHER PUBLICATIONS

L. Xue et al., "Patch-fed Planar Dielectric Slab Waveguide Luneburg Lens"; IET Microw. Antennas Propag.; vol. 2, No. 2; pp. 109-114; The Institution of Engineering and Technology; Mar. 2008.*

* cited by examiner

CONFORMAL ARRAY, LUNEBURG LENS ANTENNA SYSTEM

DEDICATORY CLAUSE

The invention described herein may be manufactured, used and licensed by or for the U.S. Government without payment of any royalties thereon.

BACKGROUND OF THE INVENTION

1. Field of the Invention

The present invention pertains generally to antennas and more particularly to an antenna configuration for realizing the dual use of target detection antenna/sensor and that of a tracking radar antenna/sensor.

2. Background of the Invention

Current antenna/sensor applications often utilize a gimbaled antenna or phased array antenna to provide for beam steering. An antenna pointing or steering gimbal adds weight, cost, pointing complexity, and inertial angle-tracking time. The electronically beam-steered phased array antennas of the prior art are very complex, expensive-to-build, and expensive-to-maintain.

Thus, phased-arrays and gimbals lend themselves to concomitant complexities, which include increased costs, steering time lag and weight. Many potential areas of application would benefit from a lighter, lower-cost, electronically steered-beam antenna which removes the need for using a gimbal mechanism or phase shifters. Such areas of application include satellite communications, air traffic control, marine navigation, and ground and air-based surveillance and tracking.

SUMMARY OF THE INVENTION

The present invention includes a Luneburg Lens which is used in conjunction with a patch antenna array. The patch antenna array is conformed or adapted to cover a portion or backside of the Luneburg len's surface with the backplane of the conformed antenna array defining a field of regard (FOR) in which objects are able to be detected and tracked. A processor is connected to a receiver/exciter module which connects to transmit/receive modules which are connected to the individual patch antennas.

The processor, the receiver/exciter module, the transmit/receive modules and a network of switches allow each patch antenna to be selectively addressed during transmitting and receiving modes. In operation, subarrays, no smaller than 2×2 arrays of patch antennas, are selectively excited to form monopulse radar beams. Upon striking an object in the FOR, the monopulse radar beam is reflected and the reflected radar beam is received at its incoming incidence angle by the Luneburg lens and directed to the opposite end of the lens and focused onto a receiving subarray which is no smaller than a 2×2 array of patch antennas.

In operation, the received radar beam is focused on a receiving subarray such that a focal point or blur spot of the Luneburg lens includes at least a portion of all the patch antennas in a given subarray with each patch antenna of a given subarray utilizing a corresponding transmit/receive module for transmitting and receiving purposes. In transmit mode, by controlling the excitation of the various subarrays in the patch antenna array, the processor controls the steering of the outputted sum radar beams by selectively activating subarrays over a given time period. In the receive mode, periodic scanning and sweeping of the subarrays of the patch antenna array, along with selective use of the electronic feed elements, allows for the simultaneous formation of sum and difference radiation patterns for monopulse tracking.

As a result of electronic steering, the present invention removes the need of mechanically steered hardware, such as gimbal mechanisms.

DESCRIPTION OF THE DRAWINGS

A more complete appreciation of the invention and many of the attendant advantages thereof will be readily obtained as the same becomes better understood by reference to the following detailed description when considered in connection with the accompanying drawings identified below.

DESCRIPTION OF THE INVENTION

Figure 1:
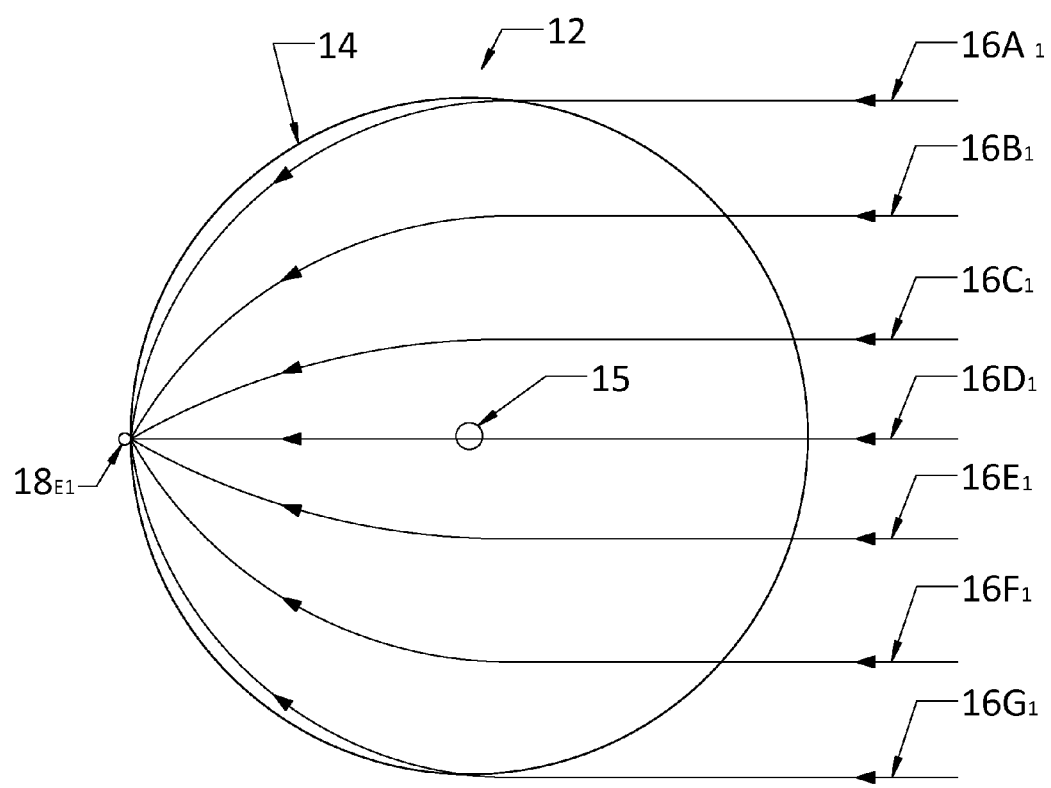
FIG. 1 is a side, partial X-ray view of the Luneburg lens of the present invention receiving incident beams or waves and focusing the waves at an exit location.

With respect to FIG. 1, a spherical radio frequency lens or Lunenburg lens 12, as utilized in the present invention, is composed of separate and concentric layers (not shown) each having a different dielectric constant according to the equation of Luneburg. The lens 12 has a surface 14 and a center region 15. As those in the art appreciate, an ideal Luneburg lens is a sphere having an index of refraction of 1 (i.e., n=1) at its surface and an index of refraction equal to the square root of two (i.e., n=1.414) at its center. As the distance from the center of a Luneburg lens is increased, the index of refraction gradually decreases. The geometry and refractive properties of the Luneburg lens causes the incident radio frequency radiation (e.g., microwaves) to travel to a location on the opposite side of the lens and exit therefrom. This exit location $18_{E1}$ can be conceptualized as being normal to a center line $16C_1$ of incident radiation, with the center line intersecting the center of the Luneburg lens and extending from one side of the lens to the opposite side.

Incident parallel waves of radiation, represented by lines $16A_1$, $16B_1$, $16C_1$, $16D_1$, $16E_1$, $16F_1$ and $16G_1$, etc., enter the Lunenburg lens 12 at various locations and travel through the lens in paths dictated by the geometric and refractive properties of the lens so as to arrive at the same exit location $18_{E1}$.

Figure 2:
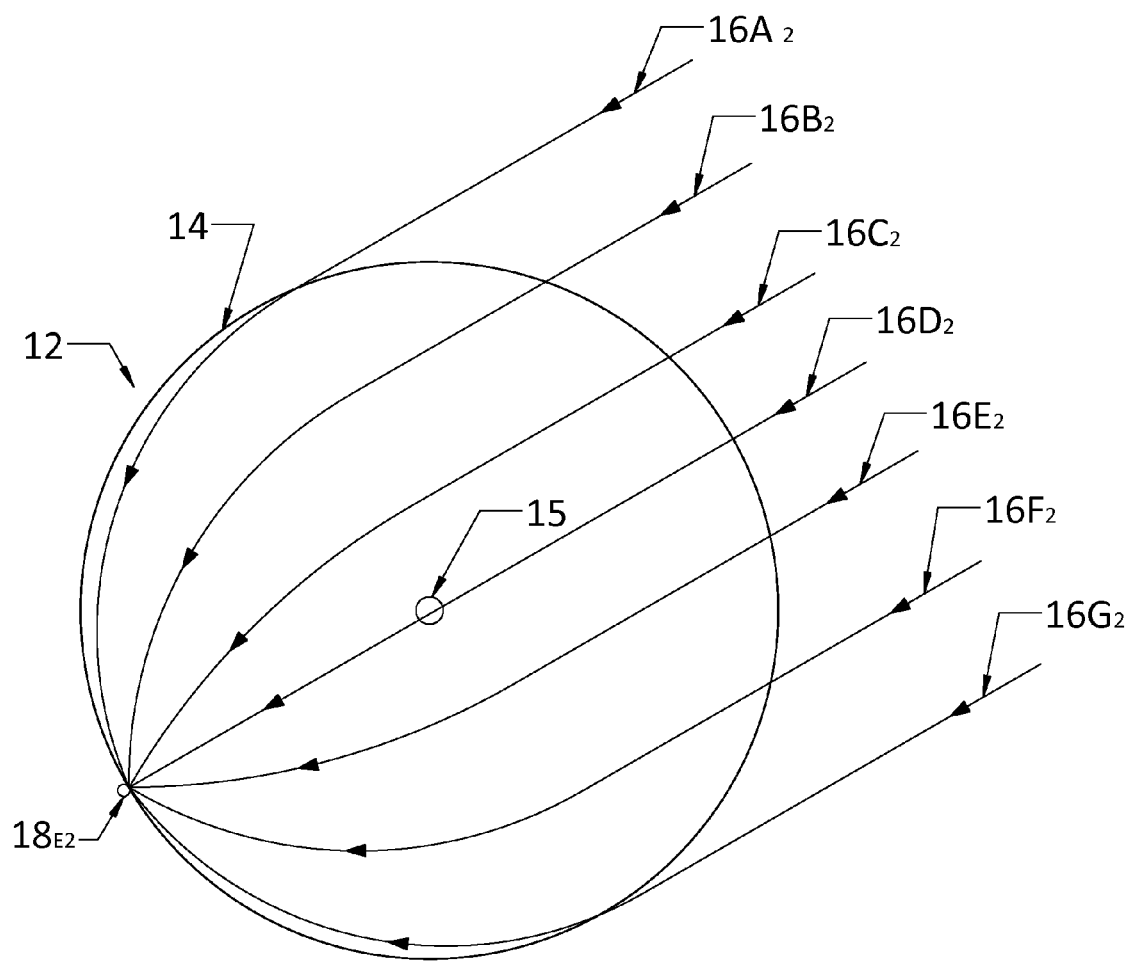
FIG. 2 is a side, partial X-ray view of the Luneburg lens of FIG. 1, with the lens receiving incident beams or waves at a different incidence angle than FIG. 1 resulting in the waves being focused at a different exit location.

In FIG. 2, the Luneburg lens 12 is positioned in the same way as it appeared in FIG. 1. What is different is that the waves of incident radio frequency radiation, represented by lines $16A_2$, $16B_2$, $16C_2$, $16D_2$, $16E_2$, $16F_2$ and $16G_2$, etc., are entering the lens at a different angular orientation. As a result of entering at a different angular orientation, the lines (i.e., waves) of radiation congregate and exit at an exit location $18_{E2}$.

As can be appreciated by a comparison of FIG. 1 and FIG. 2, the incident radiation $16A_1$, $16B_1$, $16C_1$, $16D_1$, $16E_1$, $16F_1$ and $16G_1$, etc., enters Lunenburg lens 12 (FIG. 1) at a zero degree beam steer angle whereas the incident radiation $16A_2$, $16B_2$, $16C_2$, $16D_2$, $16E_2$, $16F_2$ and $16G_2$, etc., enters Luneburg lens 12 (FIG. 2) at an increased angle.

The ability of the Luneburg lens to accommodate any number of incident angles is utilized in the present invention.

Figure 3:
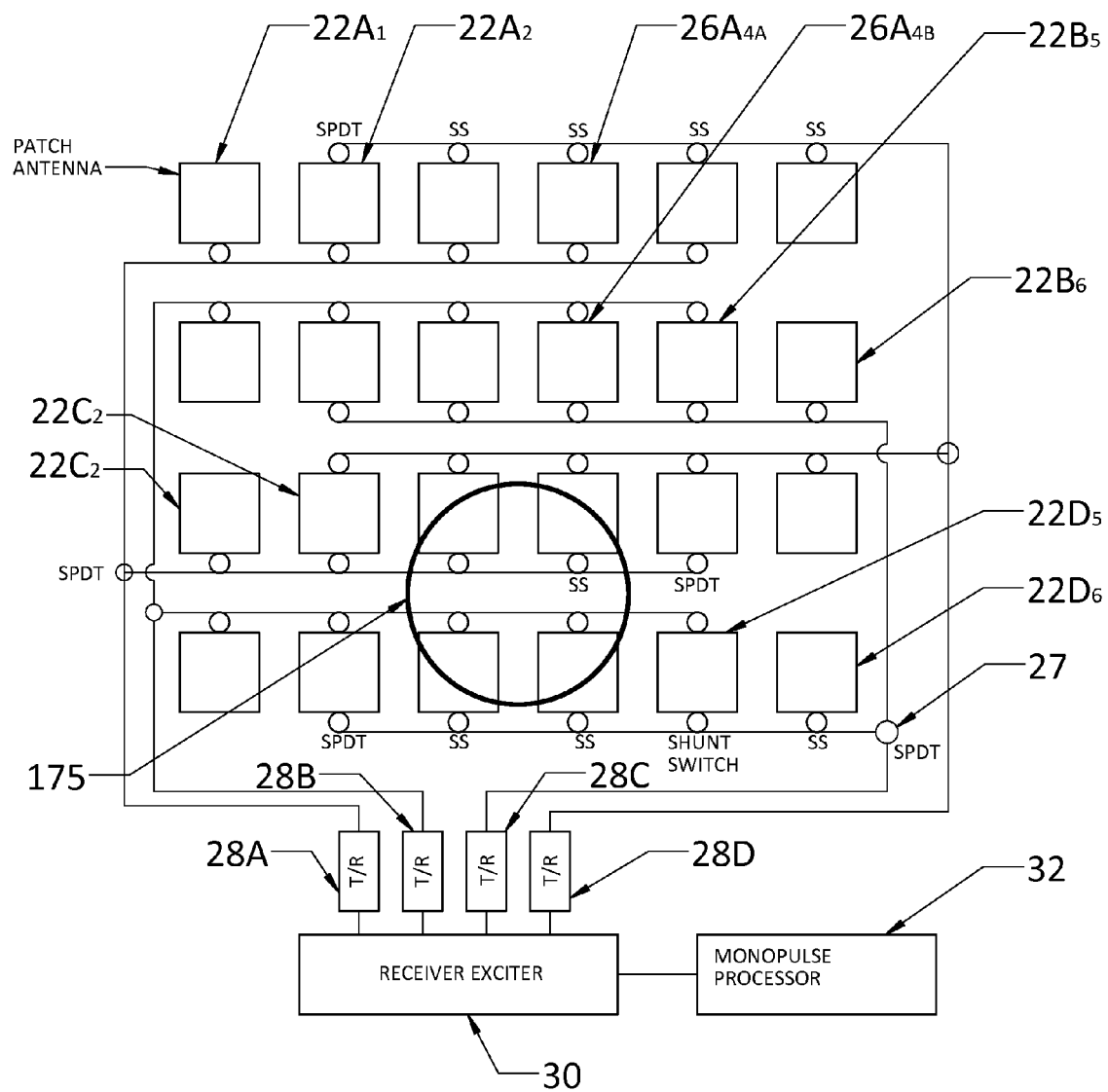
FIG. 3 is a schematic illustration of a portion of the conformed patch antenna array of the present invention, i.e., a monolithic microwave integrated circuit, provided with MEMS switching and control electronics.

In FIG. 3, patch antennas $22A_1$, $22A_2$, $22B_5$, $22B_6$, $22C_1$, $22C_2$, $22D_5$, and $22D_6$, etc., form a four by six antenna array 20. (The four by six array of FIG. 3 which is a portion 120P of the conformal array 120 is used for explanatory purposes in conjunction with FIG. 6.) The patch antennas are, more particularly microstrip patch antennas. The patch antennas are provided with a MEMS switching system 27 including shunt switches, SPDT switches and connective wiring, as are known in the art which connect to the transmit/receive modules 28A, 28B, 28C, 28D, to the receiver-exciter module 30 and to the processor 32 allowing for selective signal processing of each patch antenna. (MEMS switching systems for scanning an array of antennas are appreciated and known in the art. U.S. Pat. No. 6,388,631 to Livingston et al. teaches a MEMS switching system for an antenna array and is hereby incorporated by reference.)

The processor 32 controls scanning and sweeping of the patch antennas and processes the received electromagnetic signals for tracking purposes and selectively activates exciter circuitry in the receiver-exciter module 30, so that electromagnetic signals (e.g., microwaves) are emitted from selected path antennas during a predetermined time frame with each micro-strip patch antenna being individually addressable. The processor calculates the origination (direction, elevation, and azimuth) of the received signals as will be more fully explained below.

Figure 4:
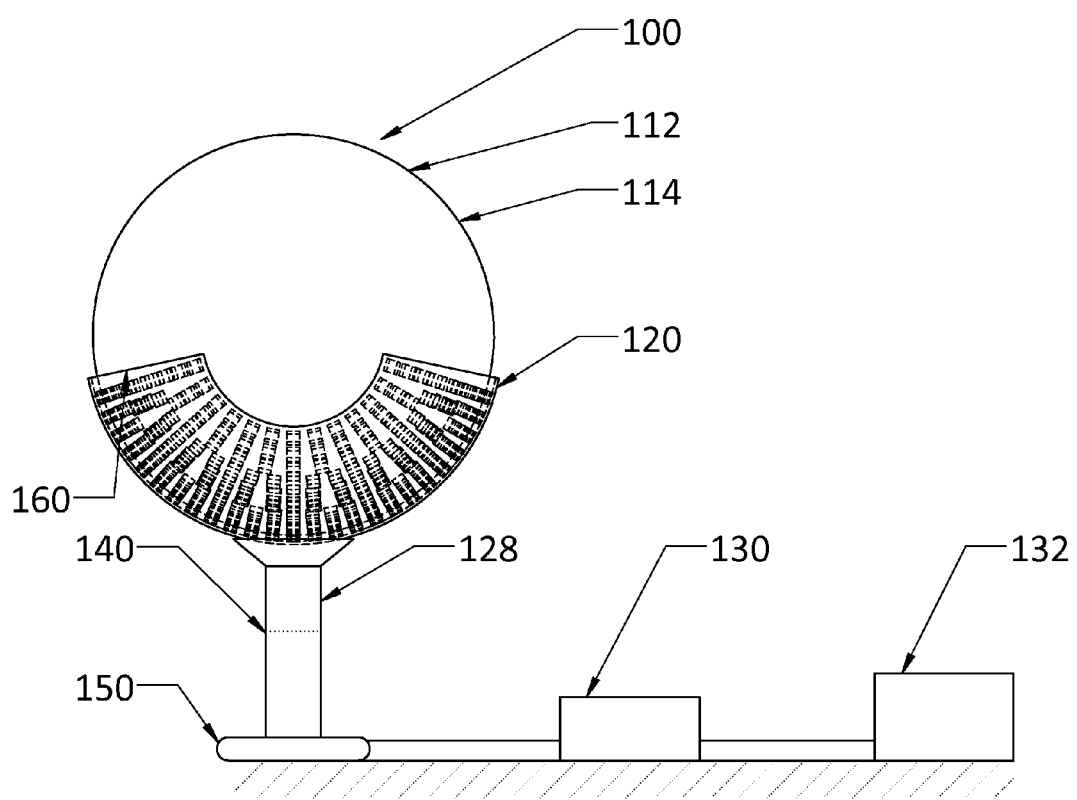
FIG. 4 is a side-view, schematic illustration of the conformal array, Luneburg lens antenna system of the present invention.

In FIG. 4, the conformal array, Luneburg lens system 100 of the present invention has a Lunenburg lens 112 which is partially covered by a conformal array of patch antennas 120. The conformal array of patch antennas 120 is comprised of a multitude of patch antennas which are arranged in a shape to fit or conform to a portion of the surface 114, i.e., the outer contours, of the Lunenburg lens 110. The extent of the angular coverage provided by the patch antennas, i.e., the angular Field of Regard (FOR), is determined by the shape and size of the conformal array of patch antennas 120.

The lens 112 and conformal array of patch antennas 120 are mounted on a surface 160 attached to base support 150. Base support 150 is connected to a conduit support 140 for supporting the lens 112 and patch antennas 120. Conduit support 140 is hollow so as to allow electrical connection from the patch antennas 120 to the transmit/receive modules 128. The transmit/receive modules 128 connect to receiver/exciter module 130 which connects to processor 132.

In the monopulse radar of the present invention, phase coherent signals are transmitted from a subarray during a given time period to form a sum radar beam, with the subarray being at least as large as a two by two array having at least two contoured rows of patch antennas and at least two contoured columns of patch antennas.

Figure 5:
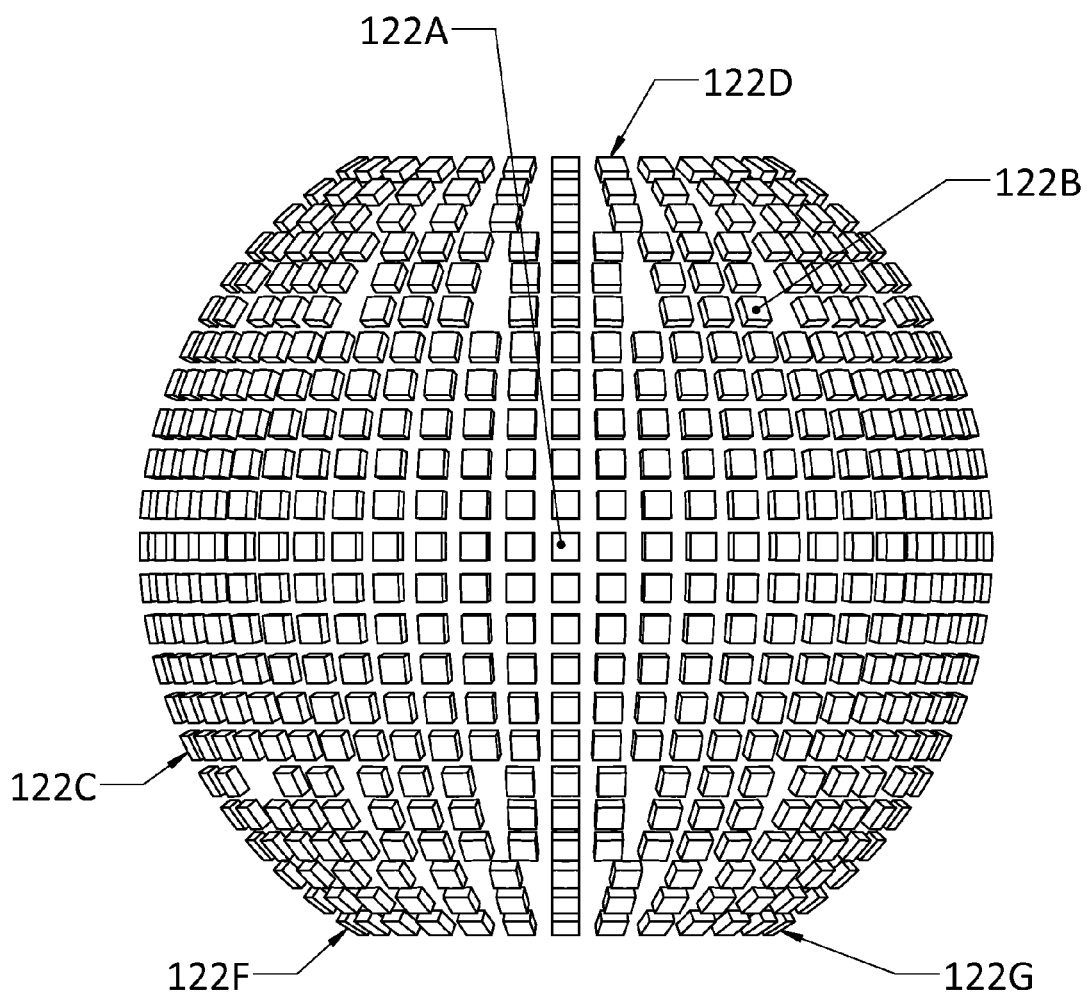
FIG. 5 is a rear view of the conformal patch antenna array according to the present invention.
Figure 6:
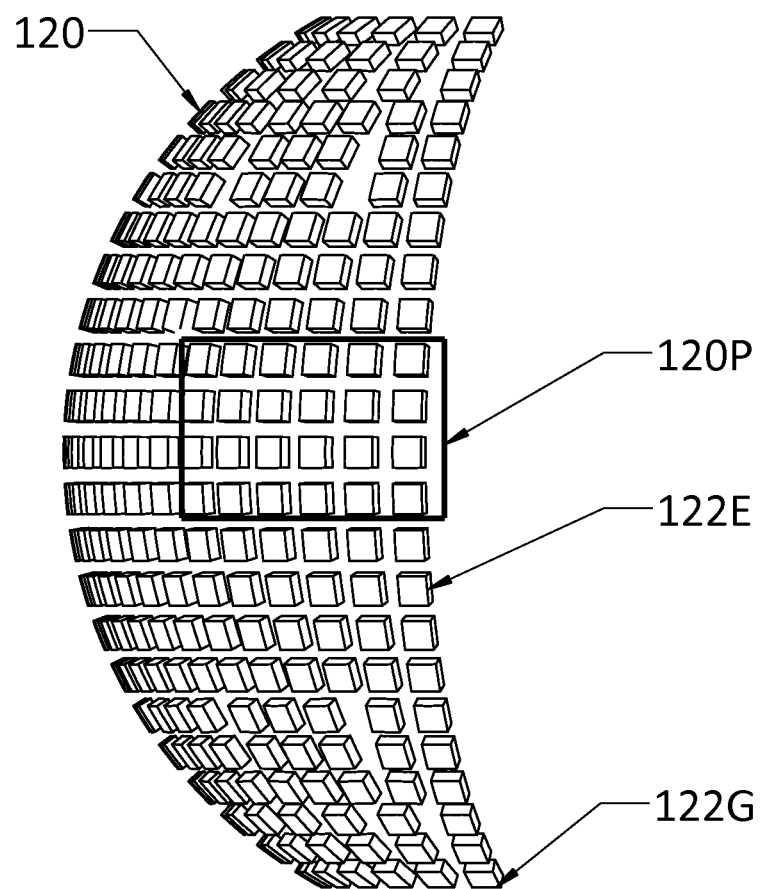
FIG. 6 is a side view of the conformal patch antenna array according to the present invention.
Figure 7:
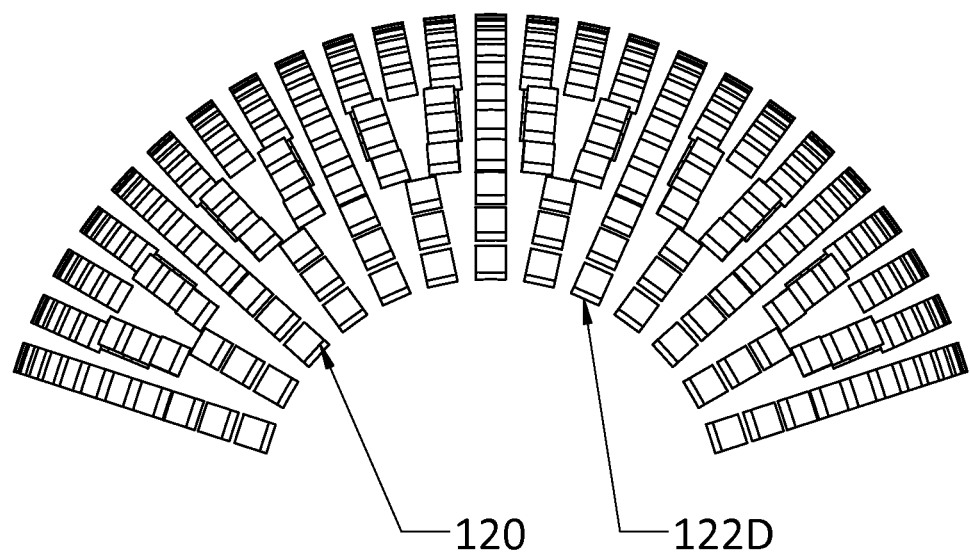
FIG. 7 is a top view of the conformal patch antenna array according to the present invention.

FIG. 5 gives a rear view of the multitude of individual patch antennas of the conformal array of patch antennas 120, with the backside of the respective patch antenna elements being shown. Individual patch antennas 122A, 122B, 122C, 122D, 122E, 122F, and 122G, for example, are located within the array of patch antennas 120. FIG. 6 shows a side view of the conformal array 120 and identifies a portion 120P of the conformal array 120. Portion 120P is comprised of four contoured rows and six contoured columns of patch antennas which are used in explanation of FIG. 10. FIG. 7 is a top view of conformal array 120.

A key electrical performance feature of the Conformal Array Luneburg Lens antenna system 100 of the present invention is determined by the angular Field-Of-Regard (FOR) set by the angular coverage by the conformal array backplane. By selectively choosing a subset (or sub-array) of patch elements within the focal point or blur spot 175, the desired sub-arrays are scanned and activated at desired angle(s) to accomplish beam steering.

Sum and difference processing of a sub-array/subset of the conformal array patch elements results in the formation of monopulse beams which allows for monopulse tracking of objects within the field of view. The sphere size of the Luneburg Lens sets the effective aperture and therefore the beam width for a given operating frequency and sets the theoretical maximum main beam peak gain.

Each 2×2 subarray of patch antenna elements in conformal array 120 are switched on via a MEMS or other switching network as are known in the art for selectively exciting antennas. Consistent with the teaching of the present invention, various 2×2 subarrays or larger are used to form monopulse signals and to receive signals passing through the Luneburg lens, with the Luneburg lens determining the location of the various blur spots as dictated by the angles of the received incident waveforms.

Upon being activated, i.e., switched on via a MEMS or other switching network, the selected subarray, e.g., a 2×2 group of patch elements, forms monopulse radar beams. The selected subarray or group of patch antennas in a particular scan angle, during a finite time interval are energized while all of the other elements of the conformal array are switched "off". In transmit mode, the patch antennas in a given subarray form a sum beam, while in a receiving mode, delta and sum beams are calculated by the processor 132. The selected, activated 2×2 element "sub-array", within the total conformal array, forms a monopulse (sum, delta-azimuth, and delta-elevation channels) radiation pattern to realize monopulse radar target tracking.

The monopulse radiation patterns, introduced by the conformal element array mounted on the hemispherical backside of the Luneburg Lens, are focused by the Luneburg Lens to radiate out the hemispherical opposite angle front-side of the Luneburg Lens. By electronically switching to different 2×2 element sub-array groups in the conformal array which are mounted across the backside of the Luneburg Lens, the monopulse radiation patterns are "steered" resulting in the monopulse radiation patterns being scanned across the desired azimuth and elevation range of the FOR of the Luneburg Lens without the need for phase shifters.

The individual patch elements of the conformal array (FIG. 3) are designed using well-known patch element and conformal array design techniques. The frequency of operation and desired polarization will dictate the exact height, width, and length dimensions requirements for the individual patch elements in the conformal array. Spacing of the patch elements is less than or equal to $\lambda/2$, where $\lambda$=operating wavelength= (speed-of-light)/(operating frequency).

The Luneburg Lens itself focuses the radiation pattern of the antenna, setting the directivity, main beam width, and gain as a function of aperture size (i.e., the diameter of the Luneburg Lens) and frequency of operation. The radiation pattern peak of the conformal patch a antenna array 120 will emanate out of the opposite side of the Luneburg Lens from the selected conformal patch feed elements. The angular coverage conformal array on the hemispherical backside of the Luneburg Lens (FIG. 13) determines the Field-of-Regard (FOR) of the overall conformal patch array Luneburg antenna sensor system 100.

An advantage of using the Luneburg Lens for beam focusing and steering are the Luneburg Len's inherent properties of reduced near-field antenna effects and absence of high-angle beam degradation common to conventional phased array antennas with electronic beam steering.

Figure 13:
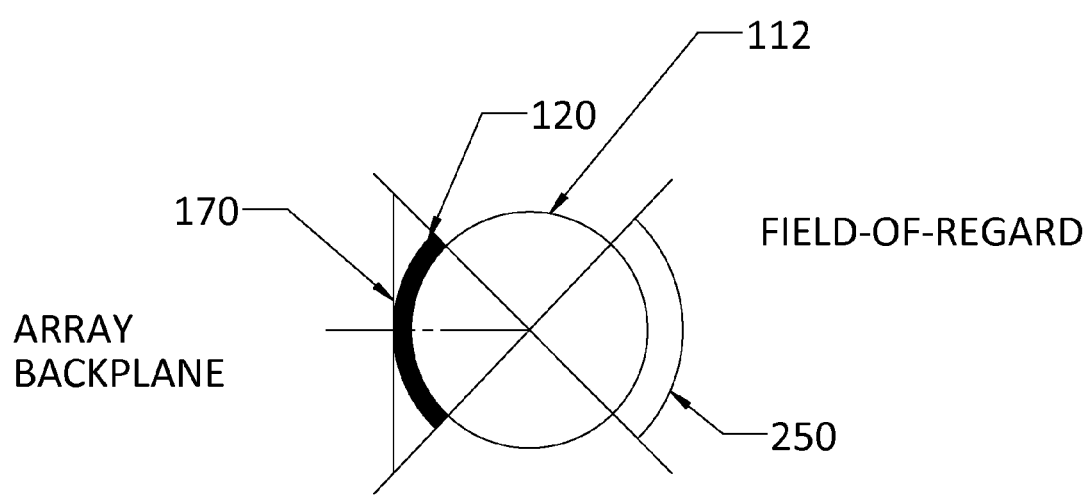
FIG. 13 is schematic illustration showing how the backplane of the conformed patch antenna array determines the field of regard in accordance with the present invention.

The angular Field-Of-Regard (FOR) of the Conformal Array Luneburg Lens is equal to the angular coverage by the conformal array backplane 170 as shown in FIG. 13 which illustrates a representative FOR scan 250 of about ±30° in the azimuth or elevation plane.

In operation, the azimuth and/or elevation pointing necessary for tracking an object can be obtained by electronically turning "on" the appropriate 2×2 sub-array group to electronically steer the monopulse radiation pattern beams of the system.

Beam steering is accomplished by selectively activating different 2×2 subsets of elements, i.e., different subarrays, on the conformal array 120.

Since no phase shifters are used to steer the Conformal Array Luneburg Lens antenna beam, the present invention does not suffer the beam steering angular distortion that conventional phase array apertures typically have. Also, the present invention allows for wide field of regard (FOR) scan-space angles of greater than ±65° to be realized.

It is noted that a much wider FOR is possible by populating the hemispherical backside of the Luneburg Lens with a larger number of total elements to cover a wider-angle portion of the backside hemisphere of the lens.

Figure 8:
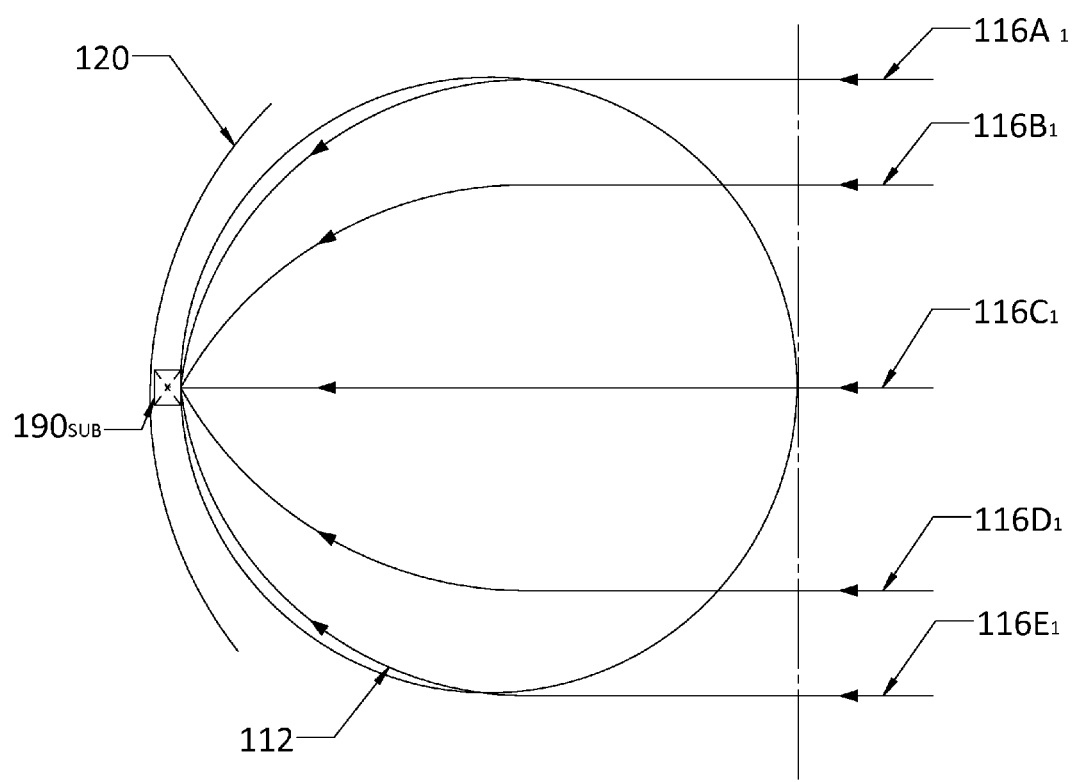
FIG. 8 is a side view of the conformal array, Luneburg lens antenna system of the present invention receiving incident radiation and directing the incident radiation to a subarray on the conformal array of patch antennas.

With respect to FIG. 8, a Luneburg lens 112 receives waveforms (returning radar beams) $116A_1$, $116B_1$, $116C_1$, $116D_1$, $116E_1$, which because of their incident angular orientation become focused on a subarray $190_{sub}$ of patch array antennas of the conformal patch array 120. The returning radar beams are processed according to a monopulse technique as will be further explained.

Figure 9:
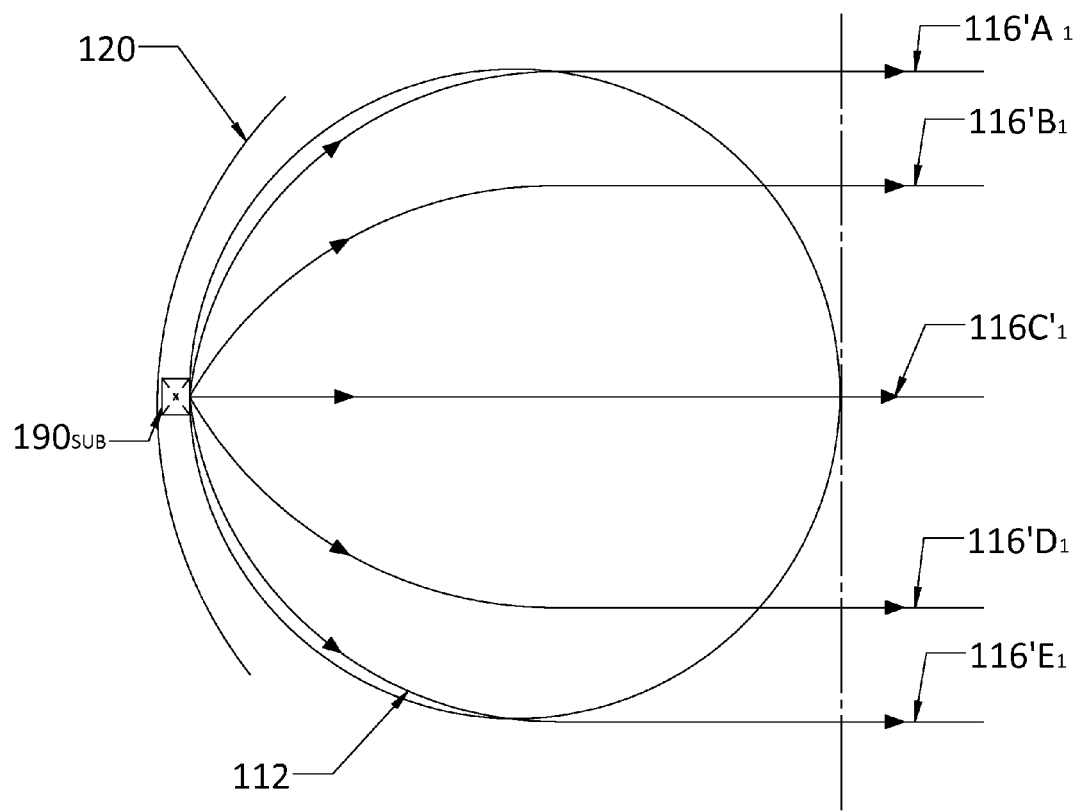
FIG. 9 is a side view of the conformal array, Luneburg lens antenna system of the present invention and depicts a transmitting subarray of patch antennas.

In FIG. 9, the subarray $190_{sub}$ upon being energized and activated by processor 132 (FIG. 4) transmits various beams $116'A_1$, $116'B_1$, $116'C_1$, $116'D_1$, $116'E_1$ so as to form a transmitted sum beam.

Multiple MEMS switching is utilized along with the processor 132, receiver/exciter 130, modules, and transmit/receive modules 128 (FIG. 4) to allow for selection of the appropriate microstrip patch antenna elements such as subarray $190_{sub}$ needed for the beam steering.

The far field beam width (BW) of the Conformal Array Luneburg Lens Antenna of the present invention is approximated as a circular flat plate:

$$BW=1.1(\lambda/D)$$

where the diameter is D=2r, twice the radius of the Luneburg lens aperture size and $\lambda$ is the wavelength associated with the center frequency of operation. (The far field radiation pattern for the Luneburg Lens is much less the $2D^2/\lambda$ near-field-to-far-field boundary limit of traditional flat or parabolic circular aperture antennas).

The Luneburg Lens size, approximated as an equivalent circular flat plate, sets the effective aperture and theoretical maximum main beam peak gain.

$$G=4\pi A_e/\lambda^2$$

where:

$$A_e=\rho_a A=\rho_a \pi r^2$$

and:
$A_e$=effective aperture
G=peak gain
$\lambda$=wavelength of operation
$\rho_a$=aperture efficiency
A=physical area of the aperture
r=radius of the Luneburg Lens Typical Luneburg Lens one-way losses are in the 1 dB to 2 dB range. Aperture efficiencies of the Luneburg Lens are in the $\rho_a$=60% to 70% range.

In the present invention, the focal point 175 (or "blur spot") of the Luneburg Lens has to be large enough to accommodate at least a 2×2 portion of the conformal array elements for a given beam angle in order to illuminate all of the sub-array patches adequately to form the monopulse beam(s). For any lens, including the Luneburg, the blur spot, $\theta_b$, in angle space is:

$$\theta_b \approx 2.44 \, \lambda/D$$

where the diameter is D=2r twice the radius of the Luneburg lens aperture size and $\lambda$ is the wavelength associated with the center frequency of operation.

The diameter of the blur spot, $d_{blur}$, then is calculated as:

$$d_{blur}=f_L \theta_b$$

where $f_L$ is the focal length of the Luneburg Lens. Since we know that the focal length of a Luneburg Lens is equal to its spherical radius (or D/2), then the blur spot size can be calculated as:

$$d_{blur}=f_L \theta_b=(D/2)(2.44 \, \lambda/D)=1.22 \, \lambda$$

With the usual spacing of array elements at $\lambda/2$ (or slightly less to avoid undesirable formation of grating lobes), two or three elements can fit within the focal point blur spot of the Luneburg Lens for both the azimuth and elevation direction. This allows for a 2×2, or possibly 3×3, sub-array portion of the conformal array elements to be illuminated with RF signals for a particular beam position.

Figure 10:
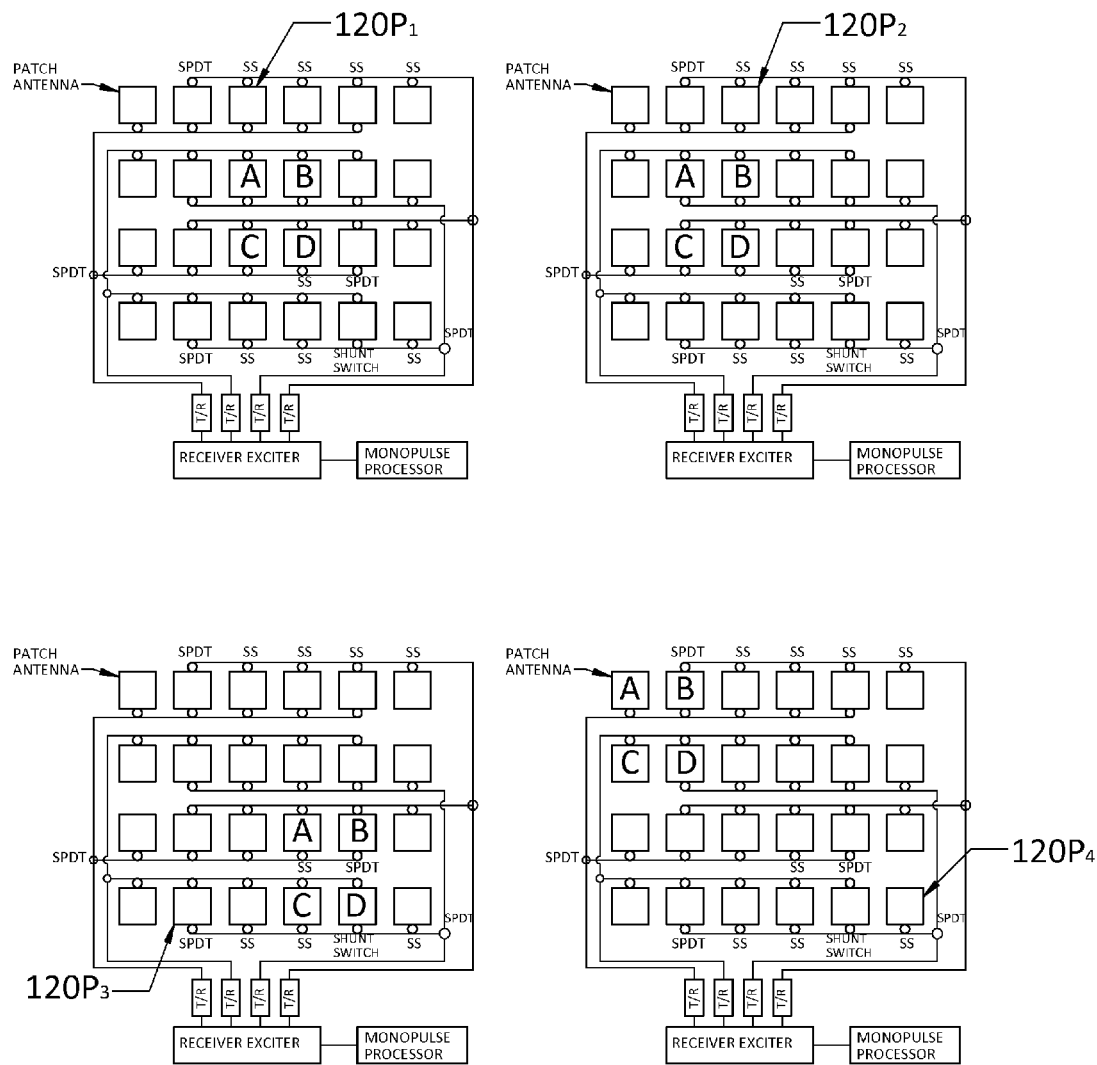
FIG. 10 is a schematic illustration demonstrating how beam steering is accomplished in the present invention.

In FIG. 10, a portion 120P of the conformal array 120 is shown with individual patch antenna elements A, B, C, D being depicted at various locations in portion 120P, depicted by portions $120P_1$, $120P_2$, $120P_3$, and $120P_4$. When patch antenna elements A, B, C, D are located in the center of portion $120P_1$, exciting elements A, B, C, D will result in the beams being steered in the middle or center. When patch antenna elements A, B, C, D are located on the left side of portion $120P_2$, exciting elements A, B, C, D will result in the beams being steered to the right side. When patch antenna elements A, B, C, D are located on the lower right side of portion $120P_3$, exciting elements A, B, C, D will result in the beams being steered to the upper left side. When patch antenna elements A, B, C, D are located on the upper left side of portion $120P_4$, exciting elements A, B, C, D will result in the beams being steered to the lower right side. In such a manner is beam steering realized in the present invention as the beams originating from patch elements in the conformal array of patch elements make their way to and through the Luneburg lens and are directed into the field of regard.

Figure 11:
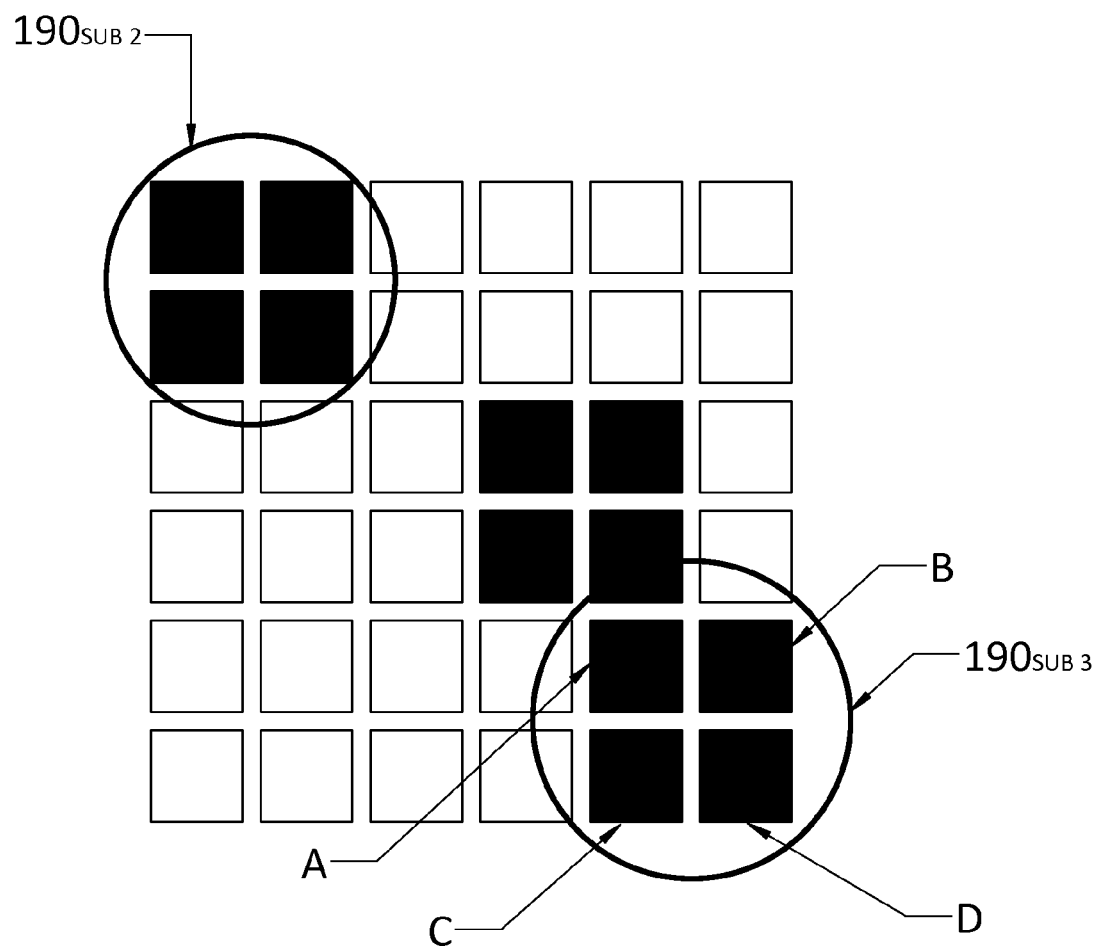
FIG. 11 is a schematic illustration of a 2×2 subarray within a larger array of patch antennas.

In FIG. 11, a 2×2 subarray $190_{sub2}$ and a 2×2 subarray $190_{sub3}$ are shown within a group of patch antenna elements of patch antenna array 120. For example, subarray $190_{sub3}$ is depicted as having patch antenna elements A, B, C, D.

Figure 12:
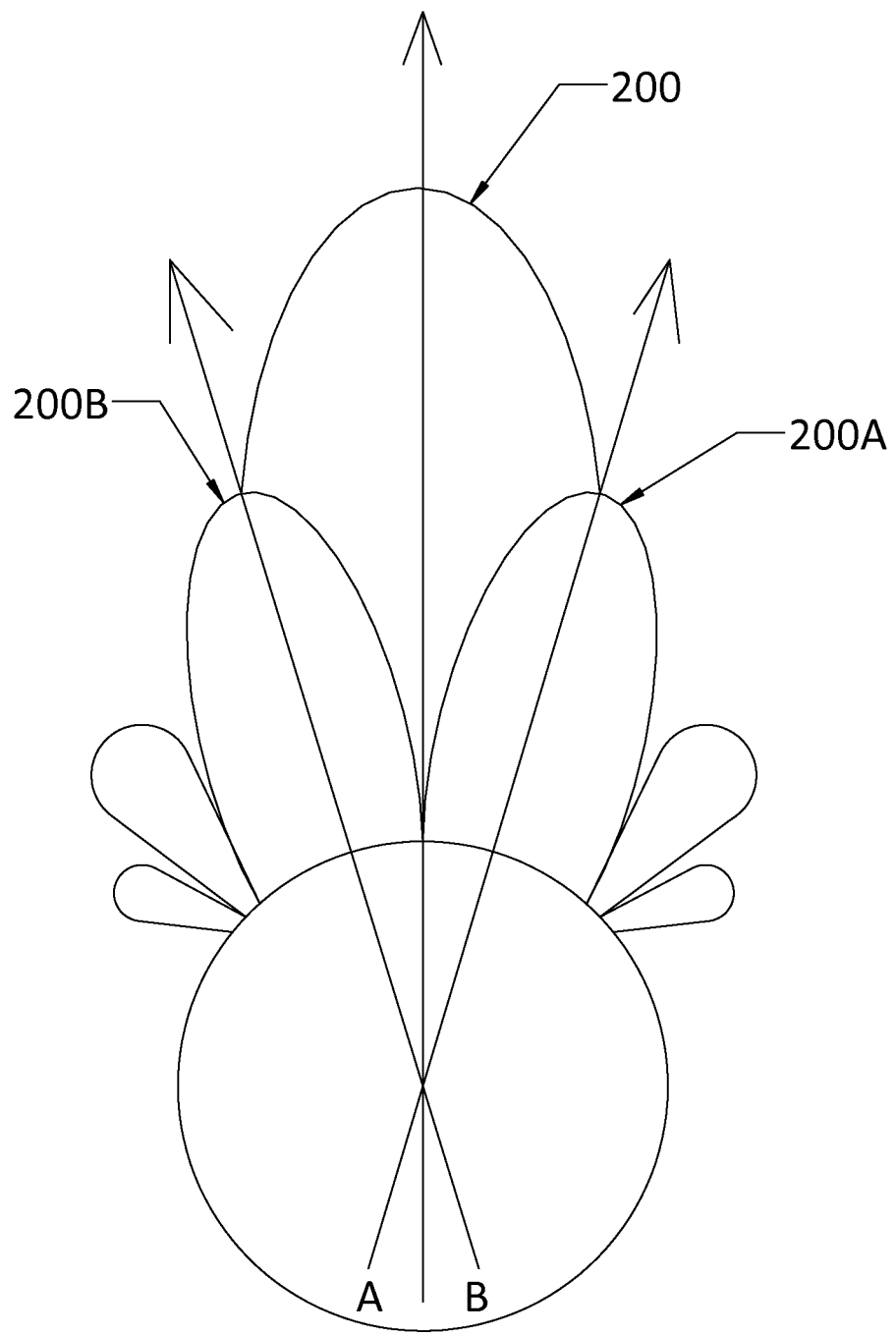
FIG. 12 is a schematic illustration of a summed beam formed by the beams of individual patch antennas positioned within the blur spot of the Luneburg lens according to the present invention.

In FIG. 11, in accordance with the present invention each patch element of the 2×2 sub-array will form its own individual beam (called a delta or "difference" beam) which is slightly offset in angle from the beams of the other patch elements of the particular subarray. FIG. 12 demonstrates the angular spacing between patch elements A and B which is equal to the angle spacing of the patches on the opposite side surface of the Luneburg Lens.

FIG. 12 shows the beam formation for a one-dimensional case (the azimuth direction, for example), the other two patches are forming similar beams, also slightly offset in angle equal to the angle spacing of the patches (in the corresponding elevation direction).

If the 2×2 patches in the sub-array (FIG. 11) are assigned conventional monopulse quadrant notation then the amplitude monopulse sum and delta (or difference) channels are realized by combining coherently the signals of the individual patch elements as:

sumbeam=$A+B+C+D$ delta azimuth beam=$(A-B)+(C-D)$ delta elevation beam=$(A+B)-(C+D)$ The angle error (or monopulse slope) can be calculated then by taking the standard delta over sum channel ratios:

azimuth angle tracking error=delta azimuth/sum=$[(A-B)+(C-D)]/[A+B+C+D]$ elevation angle tracking error=delta elevation/sum=$[(A+B)-(C+D)]/[A+B+C+D]$.

The steering of the monopulse beams is done by selection of the desired sub-array at an angle on the conformal array on the opposite-side surface of the Lens to that of the desired angle for tracking an object.

For the transmit mode, only the sum beam is used. For the receive mode, all the delta and sum beams are used. The sum and delta beams are formed, coherently in amplitude and phase, allowing for standard amplitude monopulse sensing and angle tracking of objects.

In FIG. 12, for each angle dimension, i.e., for each azimuth and elevation, the sum beam 200 which is transmitted is formed by the summation of the individual patch antenna beams 200A, 200B which correspond to the phase-coherent signals from patch elements A and B of the respective subarray.

When used in operation for searching or tracking of a target, the Conformal Array Luneburg Lens Antenna System of the present invention transmits phase-coherent signals from a subarray of the patch antenna array to form a sum beam radiating outward at the desired azimuth and elevation by utilizing the appropriate 2×2 or larger subarray on the opposite side of Luneburg Lens to that of desired azimuth and elevation angle. The outgoing transmitted signals upon contacting a target are reflected back and return along the same azimuth and elevation angle path as the signals originally sent out. The returning received signals are focused by the Luneburg Lens to the same 2×2 or larger subarray in the patch antenna array. The reflected signals returning to individual patch antennas in the subarray are then combined to form simultaneous receiving sum and difference monopulse beams. The timing of the transmitted and received signals to the subarray are used to calculate target range. The monopulse signal ratios of the received sum and difference monopulse beams are used to calculate target angle.

The present invention removes the use of phase shifters or mechanical gimbals, and nearly eliminates beam-steering time-lag, near-field antenna effects, and high-angle beam degradation due to radiation pattern beam-width changes over the field of regard (FOR). In the present invention, angle tracking errors and the antenna gain losses attributable to phase shifters are eliminated.

It is understood that the present invention is not limited to 2×2 element sub-array groups. Larger sub-arrays such as 3×3 or 4×4 element sub-array groups can be utilized for even greater accuracy. For example, in a system utilizing 3×3 sub-arrays, at least nine transmit/receive modules would be required to process the signals transmitted and received by each patch antenna element in a particular subarray.

Various modifications and embodiments can be realized without departing from the scope and spirit of the invention described herein. Accordingly, the scope of the present invention is limited by the appended claims, only.

What is claimed is:

1. A system for object detection and radar tracking, comprising:
    a Luneburg lens (112) having a curved outside surface (114);
    an array (120) of patch antennas arranged in a manner to conform to a portion of the outside surface (114) of said Luneburg lens, said array of patch antennas forming a plurality of subarrays with each subarray of said plurality of subarrays having at least two patch antennas in each column and two patch antennas in each row;
    a plurality of transmit/receive modules (28A, 28B, 28C, 28D) electrically connected to said array of patch antennas;
    a receiver-exciter module (130) electrically connected to said plurality of transmit/receive modules;
    a processor (132) electrically connected to said plurality of transmit/receive modules; and
    wherein said Lunenburg lens, when receiving incident radiation at a given angle from a detected object in the field of regard of said system, focuses a blur spot (175) which is large enough to be detected by each patch antenna of a particular subarray of said plurality of subarrays, where said particular subarray has at least two patch antennas in each column and at least two patch antennas in each row, and wherein each patch antenna of said particular subarray is connected to a corresponding transmit/receive module of said plurality of transmit/receive modules.

2. A system according to claim 1, wherein:
    said array of patch antennas are connected to a MEMS switching system.

3. A system according to claim 2, wherein:
    each antenna of said array of patch antennas is a microstrip patch antenna.

4. A system according to claim 1, wherein:
when transmitting, each patch antenna of said particular subarray forms a transmit beam which is slightly offset in angle from the transmit beams of other patch antennas in said particular subarray, with a sum beam resulting from the summation of the respective transmit beams of said particular subarray.

5. A system according to claim 4, wherein:
incident radiation received by said particular subarray is processed according to a monopulse technique.

6. A system according to claim 5, wherein:
said processor calculates a sum beam, a delta azimuth beam, and a delta elevation beam from the received incident radiation received by said each patch antenna of said particular subarray.

* * * * *